United States Patent [19]

Blair

[11] Patent Number: 5,090,866
[45] Date of Patent: Feb. 25, 1992

[54] HIGH TEMPERATURE LEADING EDGE VANE INSERT

[75] Inventor: Michael F. Blair, Vernon, Conn.

[73] Assignee: United Technologies Corporation, Hartford, Conn.

[21] Appl. No.: 572,739

[22] Filed: Aug. 27, 1990

[51] Int. Cl.⁵ .................................................. F01D 5/18
[52] U.S. Cl. ...................................... 415/115; 415/116; 415/200; 416/96 R; 416/97 R
[58] Field of Search .............. 415/115, 116, 200; 416/96 R, 97 R, 224

[56] References Cited

U.S. PATENT DOCUMENTS

| | | | |
|---|---|---|---|
| 2,585,871 | 2/1952 | Stalker | 415/115 |
| 3,315,941 | 4/1967 | Davies | 416/224 |
| 3,619,077 | 11/1971 | Wile et al. | 415/200 |
| 4,026,659 | 5/1977 | Freeman, Jr. | 415/116 |
| 4,639,189 | 1/1987 | Rosman | 415/200 |
| 4,768,924 | 9/1988 | Carrier et al. | 415/189 |
| 4,897,020 | 1/1990 | Tonks | 415/115 |

FOREIGN PATENT DOCUMENTS 0939505 11/1963 United Kingdom ............... 416/224

Primary Examiner—Edward K. Look
Assistant Examiner—Christopher M. Verdier

[57] ABSTRACT

A two part vane (38) comprises a metallic downstream portion (42) and a high temperature leading edge insert (40) disposed between two retaining buttons (46,48) loosely fit into recesses (50) formed in the inner platform (52) and the outer platform. The separation between the leading edge insert (40) and the downstream portion (42) creates two cooling louvers (64,66) for conducting cooling air from an internal cavity (58) through the cooling louvers (64,66) and down the surfaces (54,56) of the downstream portion (42).

6 Claims, 1 Drawing Sheet

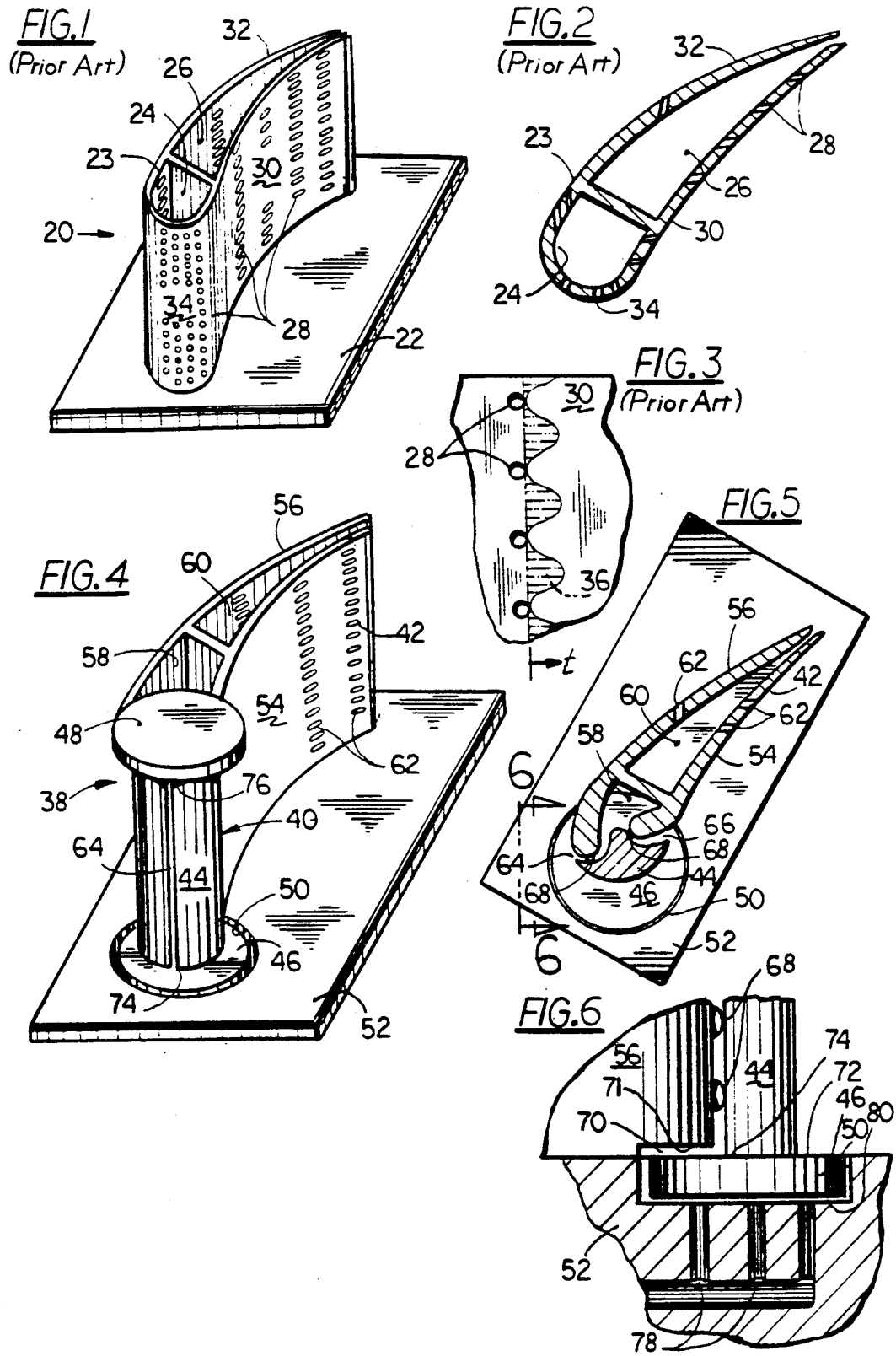

HIGH TEMPERATURE LEADING EDGE VANE INSERT

TECHNICAL FIELD

The present invention relates to stator vanes for turbine engines.

BACKGROUND ART

In a typical gas turbine engine, energy is exchanged between an axial flow of working fluid and a rotating shaft by conducting the fluid through a series of turbine stages. Each stage consists of a rotor comprised of a plurality of blades disposed on the shaft and, just upstream of each rotor, a stator comprised of a plurality of stationary blades or vanes. The purpose of the stator is to optimize the velocity profile for the working fluid entering the rotor stage in order to improve energy transfer efficiency at the rotor and thus improve overall engine efficiency.

The primary source of energy is typically a combustion process which raises the temperature of the working fluid in direct proportion to the energy added by the combustion process. Even though turbine inlet temperatures of 3600° F. (2000° C.) are possible, the temperature of the working fluid is limited by the ability to maintain the vane metal temperatures at acceptable levels, especially in the first stages.

One solution is to install a cooling system in the turbine vanes. The typical, prior art cooling system routes a portion of the relatively cool compressor bleed air, which otherwise would be used in the combustion process, into cavities in the vanes. This cooling air then passes through an array of cooling holes in the surface of the vane and into the flow of the working fluid. The density of cooling holes increases towards the leading edge of the vane where the external heat transfer rate is highest for each vane. The cooling air transfers heat from the vane during the passage through the cavity and cooling holes and creates a film of cooling air which flows over the external surface of the vane. Ideally this film of cooling air mixes gradually with the working fluid as it flows down the surface of the vane and provides a buffer layer between the hot working fluid and the vane surface. In practice, however, the momentum of the cooling air passing through the holes causes mixing of the cooling air and the working fluid at the vane surface reducing the effectiveness and increasing the number of cooling holes required.

Unfortunately, there are significant drawbacks to this type of cooling system. First, the injection of cooling air through the holes increases the thickness of the boundary layer on the vane surface and increases the aerodynamic loss. Second, the overall efficiency of the engine suffers due to having to divert a portion of compressed air away from the combustion process. Third, the creation of these arrays of holes in the vanes adds to the fabrication costs of each vane and to the total fabrication costs of a turbine. Fourth, the array of holes produces local temperature gradients across the surface of the vane and induces thermal stresses in the vane which may eventually degrade the vane surface. Finally, the performance of the cooling system degrades with time if it is utilized in a particle contaminated environment, such as is the case for aircraft applications, due to direct impingement of foreign particles on the cooling holes.

Another possible solution is to fabricate the vane entirely from a material capable of withstanding high temperatures, such as a high strength ceramic as suggested in U.S. Pat. No. 4,768,924. A properly designed ceramic vane would be able to withstand the high temperature without requiring a cooling system. Such vanes fabricated completely from ceramics are not currently practical. The primary limiting factors are the catastrophic failure mode of the ceramic material, the tendency of the failure to propagate rapidly throughout the ceramic components of the turbine, and the differing rates of thermal expansion between the ceramic components and the non-ceramic supporting components.

DISCLOSURE OF THE INVENTION

Objects of the invention include providing a heat resistant vane for a gas turbine to permit higher operating temperatures for the turbine.

It is a further object of the invention to provide a temperature resistant leading edge insert for a turbine vane which will reduce the requirement for cooling air thereby improving overall engine efficiency.

It is a further object of the invention to improve the effectiveness of the cooling system by provision of louver cooling for the vane surface downstream of the insert.

According to the present invention, a heat resistant vane is comprised of an insert fabricated from a temperature resistant material, positioned as the leading edge and disposed between two retaining buttons which are loosely fit into recesses in the inner and outer platforms, and a downstream portion. Further, a separation between the insert and the downstream portion of the vane creates two louvers which allow passage of a flow of cooling air for establishing a protective film over the downstream portion. In this way fewer cooling holes are required thereby reducing the fabrication costs, lowering the risk of damage due to thermal stresses in the vane surface, and improving the overall engine efficiency due to a reduction in compressor bleed air required for vane cooling. In addition, aerodynamic losses are reduced since the louvers generate a thinner boundary layer than the prior art cooling hole arrays.

Further, the retaining buttons are fabricated from a temperature resistant material and a flow of cooling air is conducted between the buttons and recesses to provide additional protection from high working fluid temperatures near the ends of the stator vane.

A "temperature resistant material" is defined as a material with improved heat resistant characteristics as compared to state of the art metallic materials.

Although designed for an aircraft gas turbine, the invention is equally applicable to other high temperature gas turbine uses, such as a land based, coal burning turbine.

The foregoing and other objects, features and advantages of the present invention will become more apparent in light of the following detailed descriptions of exemplary embodiments thereof, and as illustrated in the accompanying drawings.

BRIEF DESCRIPTION OF DRAWINGS

FIG. 1 is a perspective view of a prior art vane.

FIG. 2 is a cross sectional view of the prior art vane.

FIG. 3 is an illustration of the local temperature profile generated by an array of prior art cooling holes.

FIG. 4 is a perspective view of a two part vane with a high temperature leading edge insert according to the present invention.

FIG. 5 is a cross sectional view of a two part vane with a high temperature leading edge insert.

FIG. 6 is a sectional view taken along line 6—6 of FIG. 5.

BEST MODE FOR CARRYING OUT THE INVENTION

Referring now to FIG. 1, a prior art stator vane 20, disposed between a radially inner platform 22 and a radially outer platform (not shown for clarity), is comprised of an airfoil body 23, a forward cavity 24, a back cavity 26, and a plurality of cooling holes 28 through the body 23. The body 23 has a pressure surface 30 which is directly facing the flow of the working fluid, a suction surface 32 opposite the flow of the working fluid, and a leading edge 34 where the working fluid initially makes contact with the vane 20 and the density of cooling holes 28 is highest.

Relatively cool compressor bleed air, conducted into the cavities 24, 26 of the vane 20, flows through the cooling holes 28 and into the flow of working fluid due to the higher pressure of the compressor air relative to the working fluid. Referring to FIG. 2, the cooling holes 28 are angled in an attempt to direct the cooling air down the surfaces 30,32 of the airfoil body 23 to create a film of cooling air.

The initial heat transfer between the vane 20 and the cooling air takes place internal to the vane 20 as the cooling air passes through the internal cavities 24, 26 and exits through the holes 28. External of the vane 20 the film of cooling air mixes with the working fluid as it travels down the surfaces 30, 32 of the vane 20 to create a thermal buffer between the vane 20 and the working fluid.

Unfortunately the momentum of the cooling air exiting the holes 28 may cause the cooling air to mix almost immediately with the working fluid and reduce the distance downstream over which the film of cooling air acts as a thermal buffer. The rapid mixing therefore decreases the effectiveness and increases the number of cooling holes 28 required.

The film also produces an aerodynamic loss due to an increase in the thickness of the boundary layer over the surface of the vane 20 caused by the cooling air exiting the holes. In addition, due to the use of finite holes 28 to disperse the cooling air, local temperature gradients 36 are generated as shown in FIG. 3. These temperature gradients lead to thermal stresses which may result in degradation of the surfaces 30, 32 of the vane 20.

Referring now to FIGS. 4 and 5 which shows a vane according to the present invention, a two part vane 38 includes a leading edge insert 40 and a downstream portion 42. The insert 40, fabricated from a temperature resistant material, such as a ceramic material, is comprised of a leading edge portion 44 disposed between two retaining buttons 46, 48, one at each end of the leading edge portion 44, which fit loosely within recesses 50 formed in a radially inner platform 52 and a radially outer platform (not shown for clarity). The downstream portion 42, fabricated from a metallic material, includes a pressure surface 54, a suction surface 56, a forward cavity 58 formed in cooperation with the leading edge portion 44, such that the cavity 58 is bounded in part by the leading edge insert a back cavity 60, and a plurality of cooling holes 62 through the surfaces 54, 56. Two cooling louvers 64,66 are created (see FIG. 5) by the separation of the leading edge portion 44 and the downstream portion 42. Compressor bleed air, conducted into the cavities 58, 60 by means such as passages 78 (see FIG. 6) through the platforms 52, flows into the forward cavity 58 and out the two cooling louvers 64, 66 and into the back cavity 60 and out the cooling holes 62. The bleed air then flows over the surfaces 54, 56 of the downstream portion 42 to form a protective film.

Referring to FIG. 5, the leading edge portion 44 is shaped in cross-section to be essentially isothermal at steady-state conditions in order to minimize thermal stresses in the insert 40. The shape is determined by the boundary conditions of the leading edge portion 44 and taking into the account the temperature of the compressor bleed air, the temperature and flow rate of the working fluid, and the material properties.

The insert 40 is not rigidly mounted on either the downstream portion 42 or the platforms 52 to allow for differing rates of thermal expansion of the insert 40 and the surrounding metallic components. Since the retaining buttons 46, 48 are loosely fit within the recesses 50, the insert 40 has mobility within the limits of the retaining button 46, 48. The position of the leading edge portion 44 relative to the downstream portion 42 depends on the differential pressure between the compressor bleed air in the forward cavity 58 and the pressure from the flow of the surrounding working fluid. As shown in FIGS. 5 and 6, a plurality of spacing bumps 68 disposed on the forward edges of the downstream portion 42 prevent the insert 40 from repositioning, either by lateral motion or rotation about the insert 40 axis, such that either, or both, of the louvers 64, 66 may be closed.

The louvers 64, 66 provide a spanwisely even distribution of cooling air over the downstream portion 42 surfaces 54, 56 thus reducing or eliminating transverse local surface temperature gradients. Cooling holes 62 in the downstream portion 42 may still be required, but in reduced numbers as compared to a prior art vane 20 (see FIG. 1) since the temperature resistant leading edge portion 44 no longer requires the forced cooling and the forward cavity 58 requires no cooling holes because of the presence of the cooling louvers 64, 66. Due to the increased effectiveness of louver cooling, equal thermal protection of the metallic downstream portion 42 of the vane 38 is achieved with less compressor bleed air than in the prior art. In addition, the aerodynamic losses are reduced, as compared to the prior art cooling hole arrays, due to the thinner layer of cooling air required and the improved directing of the coolant flow resulting in a thinner boundary layer over the surface of the downstream portion 42.

Referring to FIG. 6, a gap 70 exists between the edge 71 of the downstream portion 42 and the adjacent surfaces 72 of the retaining buttons 46, 48. The gap 70 allows for cooling air in the forward cavity 58 to flow through to the radially inner 74 and outer ends 76 (see FIG. 4) of the leading edge portion 44 which are regions of extremely high temperatures. Additional passages 78 are provided in the platforms 52 for directly impinging cooling air on the outer surface 80 of the retaining buttons 46, 48 to further supplement cooling in this region.

In selecting a temperature resistant material for the leading edge insert 40, the following parameters are addressed as a minimum: temperature characteristics, impact resistance, energy absorption capacity, and the catastrophic failure mode of the material. Suggested materials are monolithic ceramic materials, such as SiC and Si$_3$N$_4$, and reinforced composites, such as Si$_3$N$_4$ coated carbon fiber/SiC and Si$_3$N$_4$ coated SiC-fiber/SiC. The suggestion of ceramic materials for use in the invention is not a limitation and it should be understood that the use of non-ceramic, heat-resistant materials to fabricate the insert does not alter the basics of the invention.

Although the invention has been shown and described with respect to exemplary embodiments thereof, it should be understood by those skilled in the art, that various changes, omissions and additions may be made therein and thereto, without departing from the spirit and scope of the invention.

I claim:

1. A temperature resistant vane for an axial flow gas turbine disposed between a radially inner platform and a radially outer platform, comprising:
   a metallic downstream portion disposed between said inner and outer platform;
   first and second retaining buttons disposed in a movable relationship in corresponding first and second recesses in the inner and outer platforms; and
   a temperature resistant leading edge insert disposed between said first and second retaining buttons.

2. A vane in accordance with claim 1, including a means for impinging cooling air on the surface of said retaining buttons adjacent to said inner and outer platforms.

3. A vane in accordance with claim 1, further comprising:
   a cavity internal to said vane;
   means for conducting cooling air into said cavity; and
   a gap between said downstream portion and said retaining buttons, said gap permitting passage of said cooling air between said cavity and radially inner and outer ends of said leading edge insert.

4. A temperature resistant vane for an axial flow gas turbine disposed between a radially inner platform and a radially outer platform comprising:
   a metallic downstream portion disposed between said inner and outer platform;
   a temperature resistant leading edge insert disposed in a movable relationship in an upstream direction relative to said downstream portion and said platforms;
   a cavity in the vane bounded at least in part by said leading edge insert; and
   means for conducting cooling air into said cavity at sufficient pressure to produce a pressure differential between said cavity and the axial flow such that separation is maintained between said leading edge insert and said downstream portion under at lease one operative condition of the turbine, thereby defining at least one cooling opening for exhausting a film of cooling air over said downstream portion.

5. A vane in accordance with claim 4, wherein said downstream portion is comprised of:
   a cavity internal to said downstream portion;
   means for conducting cooling air into said cavity; and
   a plurality of cooling holes through said downstream portion for exhausting cooling air over said downstream portion.

6. A vane in accordance with claim 4, wherein said separation is maintained equal to or greater than a minimum separation required to produce sufficient cooling of said downstream portion by means of a plurality of spacing bumps disposed on said downstream portion in said separation between said leading edge insert and said downstream portion.

* * * * *